United States Patent [19]

Bergman et al.

[11] 4,448,485

[45] May 15, 1984

[54] HARMONIC GENERATION USING A SURFACE OF METAL PARTICLES

[75] Inventors: John G. Bergman, Rumson; Paul F. Liao, Fair Haven; Alexander J. Wokaun, Highlands, all of N.J.

[73] Assignee: Bell Telephone Laboratories, Incorporated, Murray Hill, N.J.

[21] Appl. No.: 284,609

[22] Filed: Jul. 10, 1981

[51] Int. Cl.³ .............................................. G02B 5/18
[52] U.S. Cl. ................................................. 350/162.2
[58] Field of Search ............ 350/162.17, 162.2, 162.23

[56] References Cited

U.S. PATENT DOCUMENTS 3,585,121  6/1971  Franks et al. .................... 350/162.2

OTHER PUBLICATIONS

Bottcher, C. J. F., "Theory of Electric Polarization", Chap. 11, pp. 59–89, Elsevier Scientific Pub. Co., 1973.
McCall et al, "Surface Enhanced Raman Scattering", Physics Letters, June 9, 1980, pp. 381–383, vol. 77A, No. 5.
Gersten et al., "Electromagnetic Theory of Enhanced Raman Scattering by Molecules Adsorbed on Rough Surfaces", J. Chem. Physics, 73(7), Oct. 1, 1980, pp. 3023–3037.
JHA et al, "Intensity of Raman Scattering from Molecules Adsorbed on a Metallic Grating", Physical Review 13, vol. 22, No. 8, pp. 3973–3982, Oct. 1980.
Kerker et al, "Surface Enhanced Raman Scattering (SERS) by Molecules Adsorbed at Spherical Particles": errata; Applied Optics, vol.19, No. 24, Dec. 15, 1980, pp. 4159–4174.
Chen C. K. et al., "Surface-Enhanced Second Harmonic Generation", Physical Review Letters, vol. 46, No. 2, Jan. 12, 1981, pp. 145–148.

*Primary Examiner*—Bruce Y. Arnold
*Attorney, Agent, or Firm*—Daniel D. Dubosky; Michael J. Urbano

[57] ABSTRACT

Metal ellipsoidal particles are deposited on an ordered array of silicon dioxide posts. Each of the particles has dimensions that are less than the wavelength of a fundamental beam to be used in the generation of second harmonic radiation. The rows of particles in the ordered array are spaced at a distance that is less than one-half of the fundamental wavelength and greater than one-half of the second harmonic wavelength.

11 Claims, 10 Drawing Figures

HARMONIC GENERATION USING A SURFACE OF METAL PARTICLES

TECHNICAL FIELD

This invention relates to harmonic generation and, more particularly, to harmonic generation using insulating surfaces onto which metal particles have been deposited.

BACKGROUND OF THE INVENTION

The enhancement of surface Raman scattering due to microscopic surface roughness has been the subject of much investigation during recent years. It has been noted by those skilled in the art that surface roughness appears to be necessary in order to enhance Raman scattering on surfaces that have deposits of small metal particles. See, for example, the article entitled "Electromagnetic Theory of Enhanced Raman Scattering by Molecules Adsorbed on Rough Surfaces," by J. Gersten and A. Nitzan, *J. Chem. Physics,* Vol. 73, No. 7, October 1980, pp. 3023-3037. A theoretical model for Raman scattering by a molecule adsorbed at the surface of a spherical metal particle was the subject of a paper entitled "Surface Enhanced Raman Scattering (SERS) by Molecules Adsorbed at Spherical Particles: Errata," by M. Kerker et al, *Applied Optics,* Vol. 19, No. 24, Dec. 15, 1980, pp. 4159-4174. It was suggested in that paper that the theory presented therein for spheres could also be extended to long cylinders and to spheroids as well as to layered particles.

Theoretical investigations have also been conducted to determine the effect of constructing a grating surface of the metal which is used to provide enhanced Raman scattering from molecules that are adsorbed on that surface. See, for example, the article entitled "Intensity of Raman Scattering From Molecules Adsorbed on a Metallic Grating," by S. S. Jha et al, *Physical Review B,* Vol. 22, No. 8, Oct. 15, 1980, pp. 3973-3982. In the above-identified articles that relate to enhanced Raman scattering, it was recognized that one of the primary contributions is the plasmon resonances that are associated with the microscopic bumps on the metal surface. It has also been recognized in the art that this type of local field enhancement can be used to provide second harmonic generation at a silver air interface. See, for example, the article entitled "Surface-Enhanced Second-Harmonic Generation," by C. K. Chen et al, *Physical Review Letters,* Vol. 46, No. 2, Jan. 12, 1981, pp. 145-148. As stated in the Chen et al article, local field enhancement should also be present for all nonlinear optical processes. The Chen et al article reported measurements on second harmonic generation from smooth and roughened surfaces of silver, copper and gold. Large enhancements due to surface roughness were said to be observed.

The mechanism underlying both types of enhancements, harmonic generation and Raman scattering, is the modification of the local fields inside and surrounding a small dielectric particle. This resonance has been the subject of many theoretical studies. See, for example, chapter 11 of the book entitled "Theory of Electric Polarization," by C. J. F. Böttcher, Elsevier Scientific Publishing Company, 2nd Edition, 1973. As pointed out in the book by Böttcher, the field inside the particle is a function of the external electric field, the complex dielectric function of the particle and a depolarization factor that is dependent on the shape of the particle. It has been recognized in the art that resonant amplification of the internal field will occur if the particle is properly shaped. It has also been recognized in connection with surface enhanced Raman scattering that the radiation emitted may also be enhanced in view of the fact that a plasma sphere may amplify the radiation field twice. See, for example, the article entitled "Surface Enhanced Raman Scattering," by S. L. McCall et al, *Physics Letters,* Vol. 77A, No. 5, June 9, 1980, pp. 381-383.

SUMMARY OF THE INVENTION

A device which can provide harmonic generation is constructed in accordance with the present invention wherein metal particles having dimensions that are much less than the wavelength of light to be used as the fundamental input beam are deposited on a substrate surface such that they are insulated from each other and therefore operate as independent resonant metal particles. In accordance with the present invention these metal particles are deposited in an ordered array such that the spacing between adjacent rows is less than one-half of the wavelength of the fundamental beam and greater than one-half of the wavelength of the harmonic to be generated. Because of this spacing, the effective grating provided by the ordered array of metal particles provides a second harmonic along a path that is totally independent of the fundamental beam. As a result no additional filtering is necessary to remove energy at the fundamental wavelengths.

BRIEF DESCRIPTION OF THE DRAWING

The invention will be more readily understood after reading the following detailed description in conjunction with the drawings wherein.

DETAILED DESCRIPTION

Figure 1:
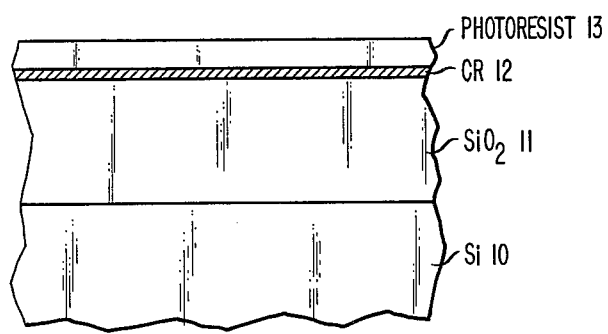
FIGS. 1-8 are cross sectional views of a silicon substrate with deposited layers that are used to construct a device in accordance with the present invention.

As pointed out in the above-identified text by Böttcher, the electric field $E_{in}$ inside a particle whose dimensions are small compared to the wavelength can be expressed by the following equation:

$$E_{in} = \frac{1}{1 + [\epsilon(\omega) - 1]A} E_o = f(\omega)E_o, \qquad (1)$$

where $E_o$ is the magnitude of the external electromagnetic field, $\epsilon(\omega)$ is the complex dielectric function of the particle and A is a depolarization factor whose values depend on the shape of the particle. This equation defines the local field enhancement factor $f(\omega)$ for particles whose dimensions are small relative to the wavelength. It can be seen from this equation that resonant amplification of the internal field will occur if the shape, packing density and frequency are such that the following condition is satisfied:

$$\epsilon(\omega) \approx 1 - 1/A \qquad (2)$$

Assuming that the particle has the shape of a general spheroid, the depolarization factor can be expressed by the following equation:

$$A_i = \frac{L_1 L_2 L_3}{2} \int_0^\infty \frac{ds}{(s+L_i^2)[(s+L_1^2)(s+L_2^2)(s+L_3^2)]^{\frac{1}{2}}} \quad (3)$$

$$i = 1,2,3$$

where the general spheroid has axes indicated by $L_1$, $L_2$ and $L_3$. The depolarization factors for the three axes will always satisfy the relationship $A_1+A_2+A_3=1$. The values for the depolarization factor obtained for three types of general spheroids is given in the following table along with the values for the complex dielectric function that must be obtained in order to achieve a resonant amplification of the internal field.

|  | $A_1$ | $\epsilon(\omega_{o1})$ | $A_2(=A_3)$ | $\epsilon(\omega_{o2})$ |
|---|---|---|---|---|
| sphere | 1/3 | −2 | 1/3 | −2 |
| 3:1 ellipsoid | 1/10 | −9 | 9/20 | −11/9 |
| infinitely sharp needle | 1/∞ | −∞ | 1/2 | −1 |

As indicated in the table for the range of geometries from a sphere to a needle, the complex dielectric function can vary from −2 through to −∞ and produce a resonance along the major axis of the ellipsoid. If the particle is made out of silver, these dielectric values can be provided by radiation having wavelengths from 3543 Å through to the deep infrared. Similarly resonant amplification can be provided along a minor axis of the ellipsoid by dielectric functions that provide values from −2 through to −1. If the particle is silver, these values of dielectric functions can be provided by wavelengths from 3543 Å to 3369 Å.

For an $n^{th}$ order nonlinear process occurring in the surface layer of a particle, the polarization is given by $$P^{(n)}\left(\sum_{i=1}^n \omega_i\right) = \epsilon\left(\sum_{i=1}^n \omega_i\right) f\left(\sum_{i=1}^n \omega_i\right) \chi^{(n)} \prod_{i=1}^n f(\omega_i)E_i. \quad (4)$$

The source of the nonlinear polarizability $X^{(n)}$ can be either the metal particles, molecules adsorbed on the metal particles, the material of upstanding posts formed on a substrate, or the material of the substrate itself. Note that in each case the presence of a surface breaks inversion symmetry so that even centrosymmetric metals and nominally symmetric molecules will generate second harmonic radiation.

From equation 4 it can be seen that the polarization for the second harmonic (n=2) is proportional to $f(2\omega)$ and $[f(\omega)]^2$ and therefore the second harmonic can be generated by either enhancing the $f(2\omega)$, the local field enhancement factor at the second harmonic, or by enhancing $f(\omega)$, the local field enhancement factor at the fundamental wavelength. Accordingly, the particles can be shaped in order to enlarge both local field enhancement factors and achieving a larger output at the second harmonic.

Figure 2:
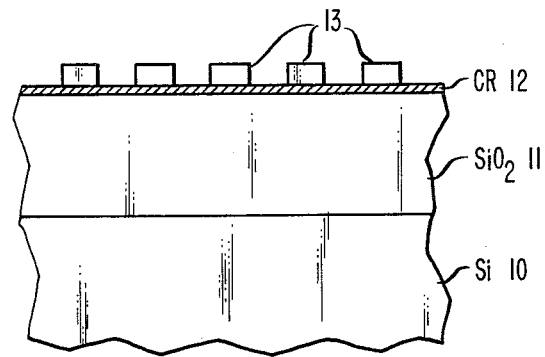
Figure 3:
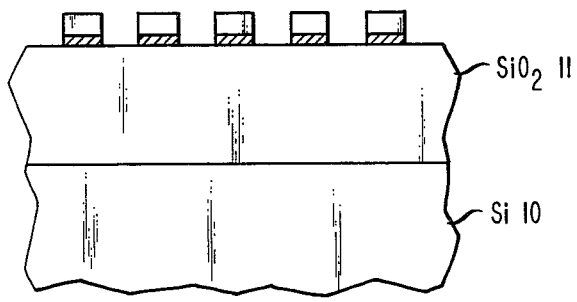

In the embodiment which was constructed in accordance with the present invention, small ellipsoidal silver particles were deposited on silicon dioxide posts with dimensions such that the second harmonic was enhanced by the major axis of the ellipsoid. The silicon dioxide posts were fabricated by starting with a silicon wafer 10 in FIG. 1 having a 500 nanometer thick thermally grown oxide layer 11. This silicon dioxide layer 11 is coated with a layer 12 consisting of 300 Å of chromium followed by a layer 13 consisting of 1000 Å of photoresist. The photoresist was then patterned by exposing it to an interference pattern having a 320 nanometer period that is formed by the interference from two 325 nanometer helium cadium laser beams. Two exposures were made with the sample rotated by 90 degrees between the exposures in order to create a crossed grating pattern. After development, an array of photoresist posts 13 is formed as shown in FIG. 2 of the drawing. This array of photoresist posts is then used as a mask for argon ion milling the chromium layer 12 thereby producing an array of photoresist and chromium posts as illustrated in FIG. 3.

Figure 4:
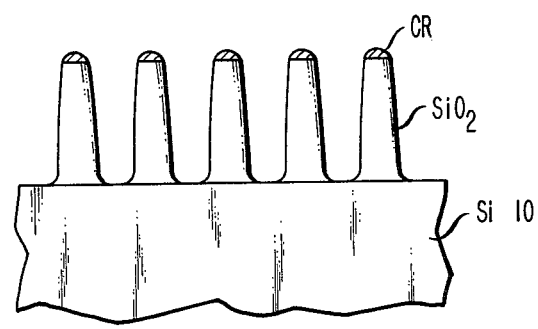
Figure 5:
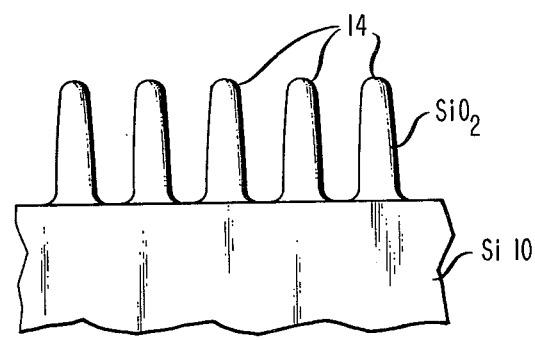

The chromium makes an excellent mask for the final highly directional reactive plasma etching of the silicon dioxide layer 11. A $CHF_3$ plasma erosion of the chromium mask produces the slightly conically shaped posts of silicon dioxide shown in FIG. 4. The entire substrate is then chemically cleaned to remove all masking layers thereby producing a silicon substrate with silicon dioxide posts 14 as shown in FIG. 5. The substrates are quite durable and because silver can be easily removed, for example, with aqua regia, they can be reused many times.

Figure 6:
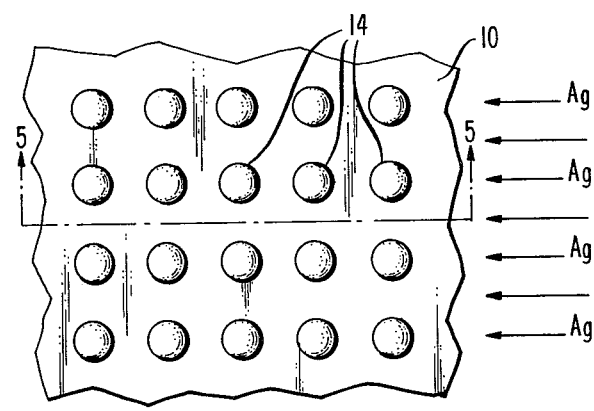
Figure 7:
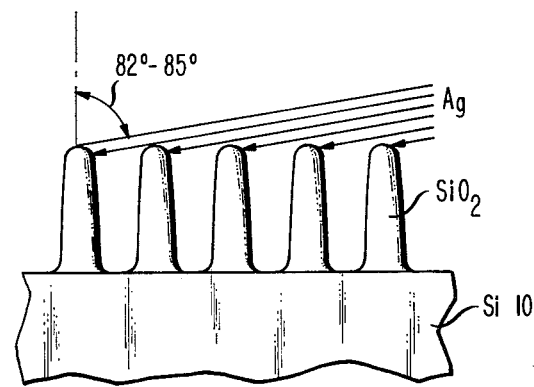
Figure 8:
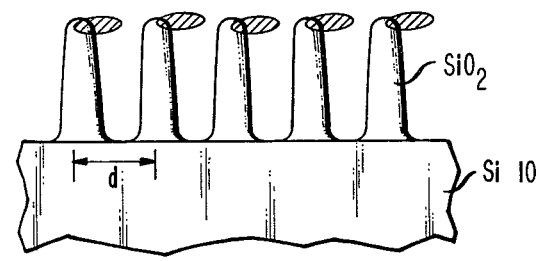

The next step in the process is to evaporate silver onto the slightly conical silicon dioxide posts as illustrated in FIG. 6. As shown in FIG. 7 the silver is evaporated at an angle of about 82–85 degrees from a normal to the substrate thereby causing silver ellipsoids of the type illustrated in FIG. 8 to be formed on the topmost portions of the silicon dioxide posts. As a result, the array of silicon dioxide posts has the appearance of having grown metal beaks. The particles were determined to be quite uniform in size and as a first approximation can be considered to be ellipsoids with a 3:1 aspect ratio. For the embodiment constructed, each particle had dimensions of about 1000×1000×3000 Å. It should be readily apparent to those skilled in the art that ellipsoids with other aspect ratios can be obtained by varying the angle and duration of evaporation.

Since the posts that support the silver particles are arranged in a regular array and the light that is used and generated is coherent, it should not be surprising that diffraction effects can be observed. For a beam of light that is incident at an angle of $\theta_{in}$ diffracted orders of the fundamental light at a wavelength $\lambda_1$ are determined by the following equation:

$$d(\sin\theta_{in} - \sin\theta_{out}) = m_1\lambda_1 \quad m_1 = 0, \pm 1, \pm 2 \ldots \quad (5)$$

where d is the post spacing and $\theta_{out}$ is the exit angle. Due to the nonlinear effects on the surface, second harmonic light is created. This light will be diffracted along output rays that have discrete angles $\theta'_{out}$. To derive a modified equation for second harmonic generation, one has to take into account the fact that a phase lag of $\pi$ along the path of an incident beam at the fundamental wavelength results in a phase change of $2\pi$ in the diffracted beam at the second harmonic. This leads to the following condition for the exit angle $\theta'_{out}$ for the second harmonic:

$$d(\sin\theta_{in} - \sin\theta'_{out}) = m_2\lambda_2, \quad m_2 = 0, \pm 1, \pm 2 \ldots \quad (6)$$

where d is the post spacing and $\lambda_2$ is the wavelength of the second harmonic. The crucial point provided by Equations 5 and 6 is that since $\lambda_1 = 2\lambda_2$ there are no exit angles provided by Equation 5 for the fundamental beam wavelength that are equivalent to the exit angles for the second harmonic corresponding to odd orders of $m_2$. Accordingly, for odd orders of $m_2$ no fundamental light is diffracted along the corresponding angles $\theta'_{out}$, that is, Gaussian beams of second harmonic are physically separated from the fundamental beam.

To advantageously concentrate the generated second harmonic light in as few output beams as possible, the spacing d is chosen such that the following condition is satisfied $$\lambda_2/2 < d < \lambda_1/2. \qquad (7)$$

Under this condition there exists no other order than the specularly reflected beam $m_1 = 0$ for the fundamental. For the second harmonic, however, there exists exactly one nontrivial solution for $m_2 = +1$. The second harmonic light is diffracted out at the angles $\theta'_{out} = \theta_{in}$ (corresponding to the $m_2 = 0$ specularly reflection) and at $\theta'_{out} = \sin^{-1} [\sin \theta_{in} - \lambda_2/d]$ (corresponding to the $m_2 = 1$ reflection). There is no fundamental light along the latter output angle. The second harmonic diffraction along this direction can therefore be utilized without having to filter out the fundamental wavelength.

Figure 9:
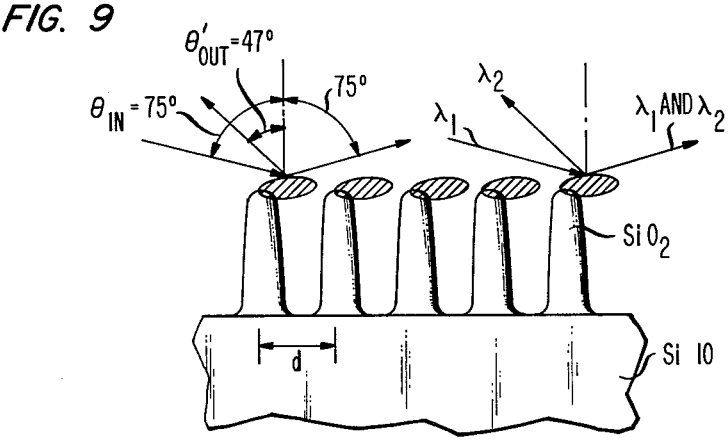
FIG. 9 is a cross sectional view of the device when used to provide second harmonic radiation.

In the embodiment which was constructed the silicon dioxide posts were at a spacing of 3150 Å. The silver particles were exposed to a coherent beam of radiation having a wavelength of 10,640 Å thereby creating a second harmonic of 5320 Å which was resonant with the major axis of the ellipsoid particles. By directing the fundamental beam toward the silver particles at an angle of incidence equal to 75 degrees as illustrated in FIG. 9, a well defined beam of second harmonic light was back-reflected at an angle of $-45 \pm 2$ degrees with respect to the normal, again as illustrated in FIG. 9. No fundamental light was determined to be diffracted along this direction. The observed angle agrees quite well with the calculated value of $-47$ degrees.

As pointed out hereinabove, the metal particles can also be shaped so as to enhance both the fundamental and the second harmonic. By shaping the particles into ellipsoids that have a 6 to 1 aspect ratio, the depolarization factors of $A_1 = 0.04323$ and $A_2 = 0.4784$ can be obtained. Resonant enhancement for these values of depolarization factors will occur with a dielectric function equal to $-22.13$ at the fundamental wavelength and equal to $-1.09$ at the second harmonic. If using silver particles, these values of dielectric function can be obtained at wavelengths of 6879 Å and 3388 Å. These two plasmon frequencies are very close to the ratio of 1 to 2 which is ideal for second harmonic generation.

Figure 10:
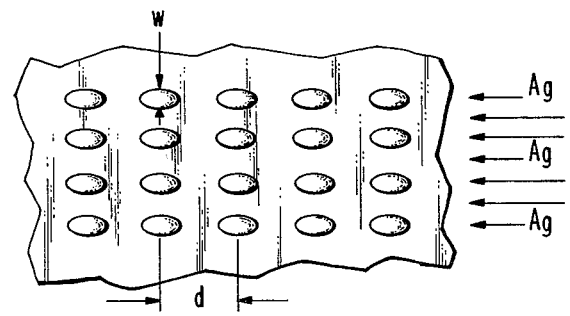
FIG. 10 is a top view of a substrate that can be used to construct a device with enhanced radiation at more than one harmonic frequency.

It should also be apparent to those skilled in the art that the particles may be shaped in even a third dimension in order to create resonant enhancement at other harmonic wavelengths. This type of shaping can be achieved by using a substrate having silicon dioxide posts with cross sectional shapes other than a circle. For example, the silicon dioxide posts illustrated in FIG. 10 would create silver particles that have three different dimensions. One dimension will be dependent on the grazing angle of the evaporated metal, a second dimension will be dependent on the duration of the evaporation, and the third dimension will be dependent on the dimension W of the posts.

It should be readily apparent to those skilled in the art that numerous departures may be made without departing from the spirit and scope of the present invention. The fundamental concept is to space the posts at a dimension which will permit the harmonic wavelength to be present along a spatial direction that is independent of the fundamental. In addition, the metal particles can be variously shaped and dimensioned in order to enhance not only the fundamental but also the harmonic wavelengths. Furthermore, the nonlinearity can be provided either by the metal particles or by molecules or materials that are placed on or near the surface that contains the metal particles. In particular, the nonlinear material may be the material used to support the metal particles, i.e., the posts. In this case, a post material such as lithium niobate with a very large intrinsic nonlinearity could be chosen.

What is claimed is:

1. A device for generating second harmonic radiation from an input fundamental beam comprising an insulating substrate surface covered with metal particles characterized in that said metal particles are arranged in an ordered array of rows and columns, wherein said rows are separated by a spacing d that is less than one-half of the wavelength of the fundamental beam and greater than one-half of the wavelength of the second harmonic radiation.

2. A second harmonic generation device as defined in claim 1 wherein each of said metal particles supports plasmons and has an essentially ellipsoidal shape having major and minor axes, and wherein a plasmon mode corresponding to oscillation in the direction of at least one of said axes is resonant with the fundamental beam or second harmonic radiation.

3. A second harmonic radiation generation device as defined in claim 2 wherein said metal particles consist primarily of silver.

4. A second harmonic radiation generation device as defined in claim 1 wherein said substrate comprises an array of upstanding posts of insulating material.

5. A second harmonic radiation generation device as defined in claim 4 wherein said posts of insulating material include material having a large intrinsic nonlinear polarizability.

6. A second harmonic radiation generation device as defined in claim 4 wherein said metal particles are evaporated onto said substrate so as to form metal protrusions which extend from the topmost portions of said insulating posts.

7. A device for creating a second harmonic beam of radiation of wavelength $\lambda_2$ in response to an input radiation beam having a fundamental wavelength $\lambda_1$ comprising: an insulating substrate covered with dielectric particles arranged in an ordered array of rows and columns, wherein said rows of dielectric particles are separated by a spacing that is less than one-half of the fundamental wavelength and greater than one-half of the second harmonic radiation wavelength.

8. A device for creating a second harmonic as defined in claim 7 wherein each of said dielectric particles supports plasmons and has an essentially ellipsoidal shape having major and minor axes, and wherein a plasmon mode corresponding to oscillation in the direction of at least one of said axes is resonant with either the fundamental beam or the second harmonic radiation.

9. A device for creating a second harmonic beam of radiation as defined in claim 8 wherein said dielectric particles consist primarily of silver.

10. A device for creating a second harmonic beam of radiation as defined in claim 9 wherein said insulating substrate comprises an array of upstanding posts of insulating material.

11. A device for creating a second harmonic beam of radiation as defined in claim 10 wherein said dielectric particles are deposited onto the posts of said insulating substrate so as to form protrusions which extend from the topmost portions of said insulating posts.

* * * * *